(12) United States Patent
Roh et al.

(10) Patent No.: US 9,813,126 B2
(45) Date of Patent: *Nov. 7, 2017

(54) METHOD FOR TRANSMITTING FEEDBACK INFORMATION VIA A SPATIAL RANK INDEX (SRI) CHANNEL

(71) Applicant: LG Electronics Inc., Seoul (KR)

(72) Inventors: Dong Wook Roh, San Diego, CA (US); Sang Gook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 399 days.

This patent is subject to a terminal disclaimer.

(21) Appl. No.: 14/555,407

(22) Filed: Nov. 26, 2014

(65) Prior Publication Data

US 2015/0085953 A1    Mar. 26, 2015

Related U.S. Application Data

(63) Continuation of application No. 13/679,780, filed on Nov. 16, 2012, now Pat. No. 8,929,241, which is a
(Continued)

(51) Int. Cl.
*H04B 7/0456* (2017.01)
*H04B 7/04* (2017.01)
(Continued)

(52) U.S. Cl.
CPC ......... *H04B 7/0456* (2013.01); *H04B 7/0486* (2013.01); *H04B 7/063* (2013.01);
(Continued)

(58) Field of Classification Search
CPC ....... H04L 1/0057; H04L 1/0072; H04L 1/08; H04L 25/03942; H04L 25/03949;
(Continued)

(56) References Cited

U.S. PATENT DOCUMENTS 7,139,274 B2 * 11/2006 Attar ................. H04W 52/146
370/282
2003/0072290 A1    4/2003 Hwang et al.
(Continued)

FOREIGN PATENT DOCUMENTS

CN          1695398          11/2005
CN          1841985          10/2006
(Continued)

OTHER PUBLICATIONS

M.M. Wang et al., "Multi-Antenna Techniques for Evolved 3G Wireless Communication Networks: An Overview," Journal of Communications, vol. 4, No. 1, pp. 61-69, Feb. 2009.
(Continued)

*Primary Examiner* — Kwang B Yao
*Assistant Examiner* — Ricardo Castaneyra
(74) *Attorney, Agent, or Firm* — Lee Hong Degerman Kang & Waimey

(57) ABSTRACT

A method for transmitting feedback information via a Spatial Rank Index (SRI) channel includes determining, at an access terminal, a value of a spatial rank index and transmitting, from the access terminal through the SRI channel, feedback information indicating the determined value of the spatial rank index according to a prescribed coding. The codeword of the prescribed coding is one of: (0,0,0,0,0,0,0,0), (1,0,1,0,1,1,0,1), (0,1,1,1,0,0,1,1), or (1,1,0,1,1,1,1,0).

8 Claims, 4 Drawing Sheets

Related U.S. Application Data continuation of application No. 12/845,632, filed on Jul. 28, 2010, now Pat. No. 8,331,483.

(60) Provisional application No. 61/231,986, filed on Aug. 6, 2009.

(51) Int. Cl.
*H04B 7/06* (2006.01)
*H04L 1/00* (2006.01)
*H04L 1/08* (2006.01)
*H04B 7/26* (2006.01)

(52) U.S. Cl.
CPC ......... *H04B 7/0665* (2013.01); *H04B 7/2628* (2013.01); *H04L 1/0057* (2013.01); *H04L 1/0072* (2013.01); *H04L 1/08* (2013.01)

(58) Field of Classification Search
CPC ... H04L 1/0058; H04B 7/2628; H04B 7/0665; H04B 7/0486; H04B 7/0456; H04B 7/063; H04W 88/12; H04W 28/10; H04W 48/20; H04W 12/06
USPC ........ 375/295, 135, 146, 260, 267; 370/252, 370/328, 329, 330, 465, 302, 335, 370/342–344, 411, 464, 478–480
See application file for complete search history.

(56) References Cited

U.S. PATENT DOCUMENTS

| | | |
|---|---|---|
| 2007/0195908 A1* | 8/2007 | Attar ................ H04B 7/0452 375/267 |
| 2008/0080641 A1 | 4/2008 | Kim |
| 2008/0095121 A1 | 4/2008 | Shattil |
| 2008/0222481 A1 | 9/2008 | Huang et al. |
| 2008/0279296 A1 | 11/2008 | Roh et al. |
| 2009/0015443 A1 | 1/2009 | Zhang et al. |
| 2009/0268843 A1 | 10/2009 | Kowalski et al. |
| 2010/0020894 A1 | 1/2010 | Chang et al. |
| 2010/0177842 A1 | 7/2010 | Chang et al. |
| 2010/0238979 A1 | 9/2010 | Lee et al. |
| 2010/0272209 A1 | 10/2010 | Lee et al. |
| 2013/0077573 A1 | 3/2013 | Roh et al. |

FOREIGN PATENT DOCUMENTS

| | | |
|---|---|---|
| CN | 101390324 | 3/2009 |
| JP | 2009-527998 | 7/2009 |
| KR | 10-2008-0032311 | 4/2008 |
| KR | 10-2009-0017352 | 2/2009 |
| KR | 10-2009-0017973 | 2/2009 |
| KR | 10-0938070 | 1/2010 |
| WO | 2007/113923 | 10/2007 |
| WO | 2009022872 | 2/2009 |

OTHER PUBLICATIONS

E. Lindskog et al., "Closed Loop MIMO Precoding," IEEE 802.16 Broadband Wireless Access Working Group, IEEE 802.16e-04/293r2, Nov. 2004.

G. Castagnoli et al., "On Repeated-Root Cyclic Codes," IEEE Transactions on Information Theory, vol. 37, No. 2, pp. 337-342, Mar. 1991.

LG Electronics, "On the design of PCFICH coding," 3GPP TSG RAN WG1 #49bis, R1-072881, Jun. 2007, 3 pages.

State Intellectual Property Office of the People's Republic of China Application Serial No. 201080042571.1 Office Action dated Dec. 9, 2013, 8 pages.

State Intellectual Property Office of the People's Republic of China Application Serial No. 201510088675.0, Office Action dated Sep. 15, 2017, 16 pages.

* cited by examiner

METHOD FOR TRANSMITTING FEEDBACK INFORMATION VIA A SPATIAL RANK INDEX (SRI) CHANNEL

CROSS-REFERENCE TO RELATED APPLICATIONS

This application is a continuation of U.S. application Ser. No. 13/679,780, filed on Nov. 16, 2012, now U.S. Pat. No. 8,929,241, which is a continuation of U.S. application Ser. No. 12/845,632, filed Jul. 28, 2010, now U.S. Pat No. 8,331,483, which claims the benefit of U.S. Provisional Application No. 61/231,986, filed on Aug. 6, 2009, the contents of which are all hereby incorporated by reference herein in their entirety.

FIELD OF THE INVENTION

The present invention generally relates to wireless communications, and in particular, to transmitting feedback information in a wireless communications channel.

DESCRIPTION OF THE RELATED ART

In the field of error correction coding, a binary error correction code may be notated as an [n, k, d] code, where the value 'n' represents the length (in bits) of each codeword of the code, the value 'k' represents the number of information bits encoded in each codeword, and the value 'd' represents a minimum distance between the codewords. Because the [n, k, d] code is a binary code, the code has a total of $2^k$ codewords. As a form of shorthand, the binary error correction code may be referred to as an [n, k] code.

The distance between two selected codewords corresponds to the number of bits (or bit positions) having bit values that are different from each other. If the distance between two codewords is equal to or greater than (2a+1), where 'a' is an integer, then, between the two codewords, up to 'a' bit errors can be corrected. For example, if two given codewords of a code are '101011' and '110010', the distance between the two codewords is 3 because the second, third and sixth bit positions (counting from the most significant bit located at the left end) have bit values that are different from each other. Because the distance is equal to 3, up to one bit error can be corrected.

A minimum value among distances between codewords of a code is referred to as a minimum distance of the code. The minimum distance is a typical metric that may be used to evaluate the performance of a code. The larger the minimum distance, the less likely that a given codeword will be erroneously interpreted as another codeword. As such, a larger minimum distance generally corresponds to a higher level of performance. The degree to which a code provides maximization of the minimum distance may serve as a measure of high performance.

SUMMARY OF THE DISCLOSURE

In accordance with an embodiment, a method for transmitting feedback information via a Spatial Rank Index (SRI) channel includes determining, at an access terminal, a value of a spatial rank index and transmitting, from the access terminal through the SRI channel, feedback information indicating the determined value of the spatial rank index according to a prescribed coding. The codeword of the prescribed coding is one of:

(0,0,0,0,0,0,0,0),
(1,0,1,0,1,1,0,1),
(0,1,1,1,0,0,1,1), or
(1,1,0,1,1,1,1,0).

In accordance with another embodiment, a method for generating/transmitting a codeword includes determining, at an access terminal, information regarding a value of a spatial rank and generating, at the access terminal, the codeword to represent the determined information, the generating comprising combining a first codeword of a (3, 2) simplex code and a second codeword of a (5, 2) shortened Hamming code.

Another embodiment relates to an access terminal for transmitting feedback information via a Spatial Rank Index (SRI) channel. The access terminal includes a controller configured to determine a value of a spatial rank index; and a transmitter configured to transmit feedback information via the SRI channel, wherein the feedback information indicates the determined value of the spatial rank index according to a prescribed coding. The codeword of the prescribed coding is one of:

(0,0,0,0,0,0,0,0),
(1,0,1,0,1,1,0,1),
(0,1,1,1,0,0,1,1), or
(1,1,0,1,1,1,1,0).

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF THE PREFERRED EMBODIMENTS

Figure 1:
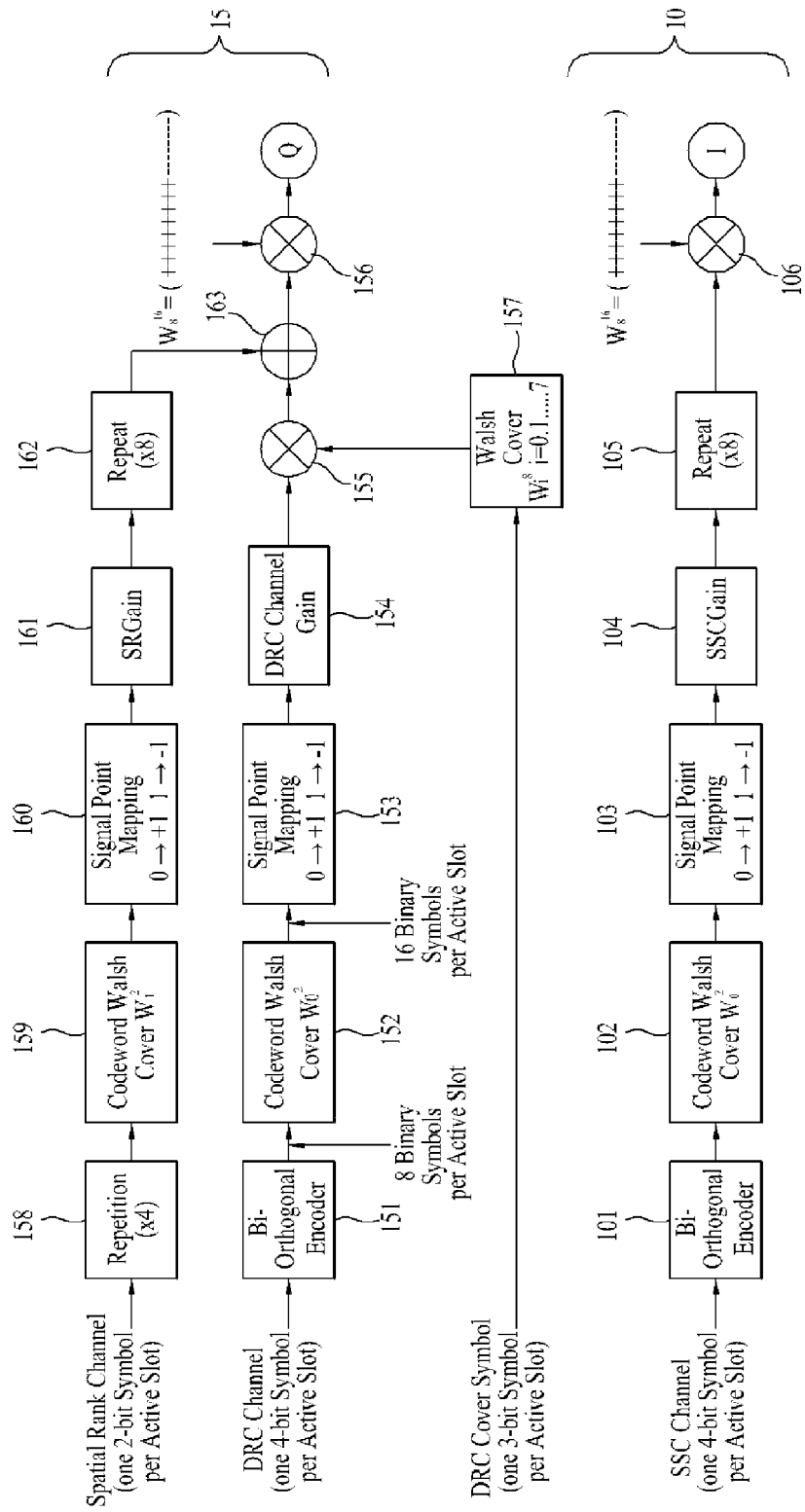
FIG. 1 is a partial block diagram of various operations implemented by a mobile station (MS) transmitter in a MIMO system.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be presented herein in the context of a wireless communication network and associated entities configured in accordance with the High Rate Packet Data (HRPD) protocol, which is optimized for high speed, high capacity data transmissions. However, alternatives to such implementations are envisioned, and teachings with regard to the HRPD protocol are generally applicable to other standards and air interfaces as well. Moreover, the use of certain terms to describe various embodiments should not limit such embodiments to a certain type of wireless communication system, such as HRPD. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), universal mobile telecommunications system (UMTS), the long term evolution (LTE) of the UMTS, and the global system for mobile communications (GSM). By way of non-limiting example only, further description will relate to an HRPD communication system, but such teachings apply equally to other system types.

Furthermore, particular embodiments of the invention are directed to providing an error correction coding scheme to convey spatial rank information in an HRPD system (e.g., a system configured in accordance with HRPD revision C).

The HRPD protocol applies Code Division Multiple Access (CDMA) technology and Time Division Multiplexing (TDM) technology in, for example, the transmission of data from a mobile station. Due to its improved data transmission rate and capacity, an HRPD system can provide multimedia contents in various technical fields of application, such as wireless Internet access, real-time road traffic information, wireless live broadcasts, movies, and games.

In Revision C of the HRPD protocol, a MIMO (Multiple Input Multiple Output) scheme is included. In general, MIMO may involve the use of multiple antennas at both the transmitter and the receiver. As such, MIMO may be used to increase a diversity gain in order to reduce performance deterioration caused by a fading environment of a channel. In addition, MIMO may involve the transmission of multiple layers or multiple streams. As such, MIMO may be used to increase a data transfer rate of a given channel. Relative to a single-input single-output system using a single transmitting/receiving antenna, a MIMO system can transmit a larger quantity of data without requiring an increase in frequency bandwidth.

In a MIMO system, a channel can be decomposed into multiple independent channels. For example, when the number of transmission antennas is Nt and the number of receiving antennas is Nr, the maximized number of independent channels, Ni, equals the smaller of Nt and Nr. Each independent channel can be referred to as a spatial layer.

The number of spatial streams that can be multiplexed may be expressed in a MIMO channel matrix, and a rank may be defined as the number of non-zero eigenvalues in such a MIMO channel matrix. The rank may also be defined as the number of independent channels. For example, if the rank of a system equals one, then one spatial stream can be transmitted on one spatial layer. If the rank is two, then two independent streams can be simultaneously transmitted on two spatial layers. If the rank is K, then K independent streams (e.g., K streams that may have different rates) can be transmitted on K spatial layers.

In order to obtain gain for multiple antennas, channel-dependent feedback provided by a user equipment may be used to tune a multiple antenna transmission scheme.

So that MIMO is operated smoothly, channel state information should be available at the transmit side (e.g., at a base station). Since such channel state information could be measured only at the receiver side (e.g., at the mobile station), this channel state information should be fed back to the transmitter from the receiver. The channel state information can be delivered in various ways. For example, the information may be fed back via a direct channel quantization. If such a direct channel feedback enables the transmitter to know the channel perfectly, then the transmitter could determine the transmission mode according to the channel status.

As another example, the information may be fed back using a transmission mode related scheme such as an MCS (Modulation Coding Scheme), rank, and precoding matrix. If the transmitter is provided with an MCS, rank and precoding matrix that is fed back without error, then the fed back MCS, rank and precoding matrix can be used directly after the reporting information is received at the transmitter.

Therefore a reporting of an MCS, rank and precoding matrix may serve as an efficient vehicle for providing channel feedback.

In HRPD revision C, channels have been introduced to deliver MIMO-related feedback such as rank and precoding index. For example, the Spatial Rank Channel (SRC) is used to provide a rank feedback, and the Spatial Signature Channel (SSC) is used to provide a precoding index.

It should be noted that precoding may also be referred to as spatial signature, precoding, prefiltering, etc. Also, MCS is common to both non-MIMO (or single-input-single-output (SISO)) systems up to HRPD revision B and MIMO systems in HRPD revision C, and MCS can be delivered via an existing Direct Rate Control (DRC) channel without any significant changes.

With reference to FIG. 1, various operations that may be implemented in a transmitting entity, such as a mobile station (MS) transmitter, in a MIMO system are configured to encode and modulate information including spatial rank and spatial signature. In the following description regarding FIG. 1, the spatial rank and spatial signature information will be described with reference to a system employing 4 transmit antennas. It is understood that, in a system employing only 2 transmit antennas, certain parameters may differ from the 4-transmit-antenna system. For example, relative to a system employing 4 transmit antennas, a system employing only 2 transmit antennas may require a different number of bits to convey spatial rank and spatial signature information.

With reference to FIG. 1, a transmitter of a mobile terminal is configured to encode and modulate a four-bit spatial signature and a two-bit spatial rank for a system employing four transmit antennas. The transmitter includes an In-Phase branch (I-Branch) 10 and a Quadrature Branch (Q-Branch) 15. The I-Branch 10 includes a Bi-Orthogonal Encoder 101, a Codeword Walsh Cover ($W_0^2$) component 102, a Signal Point Mapper 103, a spatial signature channel (SSC) Gain element 104, a Repeater (×8) 105, and a Modulator 106. The Q-Branch 15 includes a Bi-Orthogonal Encoder 151, a Codeword Walsh Cover ($W_0^2$) component 152, a Signal Point Mapper 153, a direct rate control (DRC) Channel Gain element 154, Modulators 155 and 156, and a Walsh Cover ($W_i^8$) component 157. In addition, the Q-Branch 15 includes a Repeater (×4) 158, a Codeword Walsh Cover ($W_1^2$) component 159, a Signal Point Mapper 160, a spatial rank channel (SRC) Gain element 161, a Repeater (×8) 162, and an adder 163.

With continued reference to FIG. 1, a four-bit SSC symbol is input to the I-Branch 10. A two-bit SRC symbol and a four-bit DRC symbol are input to the Q-Branch 15. Because the SRC symbol is two bits long, the symbol can convey up to 4 distinct spatial rank values (e.g., spatial rank values ranging from 0 to 3, ranging from 1 to 4, etc.).

Similarly, because the SSC symbol is four bits long, it can support up to sixteen distinct spatial signatures. These spatial signatures may be predefined for the system, predefined for each particular sector, or negotiated during connection setup. According to various embodiments, a set of distinct spatial signatures numbering from 9 to 15 are predefined or negotiated.

As previously described, the two-bit SRC symbol is input to the Q-Branch 15. In more detail, the two-bit SRC symbol is input to the Repeater (×4) 158 before being spread by the Codeword Walsh Cover ($W_1^2$) component 159. The Repeater 158 repeats the two bits of the SRC symbol in series, four times, to produce an 8-bit codeword. For example, a two-bit SRC symbol of '00' is repeated by the Repeater 158 to produce a codeword of '00000000.' Similarly, a two-bit SRC symbol of '002001' is repeated by the Repeater 158 to produce a codeword of '01010101'.

The codewords produced by the Repeater 158 for all possible values of the two-bit SRC symbol are shown in Table 1 In essence, the Repeater 158 implements a type of (8, 2) binary coding scheme in producing the codewords. The minimum distance of the coding scheme shown in Table 1 is 4 bits. As such, the coding scheme implemented in the Repeater 448 provides a minimum distance of 4 bits.

TABLE 1

SRC Repetition Encoding

| SRC values | Codeword |
|---|---|
| 0x0 (00) | 00000000 |
| 0x1 (01) | 01010101 |
| 0x2 (10) | 10101010 |
| 0x3 (11) | 11111111 |

The (8, 2) repetition coding scheme described above may not be optimal, as determined by various measures. One such measure is the minimum distance between codewords. The larger the minimum distance between codewords, the stronger the error correction capability. As such, embodiments of the present invention are directed to providing an (8, 2) code that provides a larger minimum distance (and therefore stronger error correction capability) relative to the (8, 2) repetition code described with reference to FIG. 1 and Table 1 . Particular embodiments are directed to providing such an (8, 2) code for conveying up to 4 distinct spatial rank values (e.g., for use in systems employing 4 transmit antennas).

According to one embodiment, a maximal value of the minimum distance is achieved. With regard to determining this value for a given set of codes, the Plotkin bound will now be described. In general, for given values of 'n' and 'k', the maximal minimum distance among all (n, k) codes may be difficult to determine. However, within the realm of (8, 2) codes, the maximal value of the minimum distance can be determined by calculating the Plotkin bound. The Plotkin bound describes the relationship between minimum distance, number of codewords and the bit lengths of codewords. The Plotkin bound is a well-understood technique and is described in, for example, a publication authored by John G. Proakis, "Wiley Encyclopedia of Telecommunications," Wiley Interscience, New Jersey, 2003, vol. 2, pp 929-935.

Assuming a general binary [n, k, d] code where n is a number of bits in a codeword, k is a number of bits of information carried in the codeword, and d is the minimum distance between codewords, then the Plotkin bound can be expressed as in Equations (1) below.

$$\begin{cases} 2^k \le 2\left(\dfrac{d}{2d-n}\right) & \text{if } d = \text{even}, d > \dfrac{n}{2} \\ 2^k \le 4d & \text{if } d = \text{even}, d = \dfrac{n}{2} \\ 2^k \le 2\left(\dfrac{d+1}{2d+1-n}\right) & \text{if } d = \text{odd}, d > \dfrac{n-1}{2} \\ 2^k \le 4(d+1) & \text{if } d = \text{odd}, d = \dfrac{n-1}{2} \end{cases}$$

Alternatively, the Plotkin bound can be expressed as in Equations (2) below. Equations (2) more clearly express the limitations on the value of the minimum distance.

$$\begin{cases} d \le n \times \dfrac{2^{k-1}}{2^k - 1} & \text{if } d = \text{even}, d > \dfrac{n}{2} \\ d = \dfrac{n}{2} \ge 2^{k-2} & \text{if } d = \text{even}, d = \dfrac{n}{2} \\ d \le (n-1) \times \dfrac{2^{k-1}}{2^k - 1} + \dfrac{1}{2^k - 1} & \text{if } d = \text{odd}, d > \dfrac{n-1}{2} \\ d = \dfrac{n-1}{2} \ge 2^{k-2} - 1 & \text{if } d = \text{odd}, d = \dfrac{n-1}{2} \end{cases}$$

Based on Equations (1) and (2), it is calculated that the maximal minimum distance among (8, 2) codes is 5 bits. Equation (3) below illustrates the calculations for the case of (8, 2) codes.

$$d \le (n-1) \times \dfrac{2^{k-1}}{2^k - 1} + \dfrac{1}{2^k - 1} =$$

$$(8-1) \times \dfrac{2^{2-1}}{2^2 - 1} + \dfrac{1}{2^2 - 1} = 7 \times \dfrac{2}{3} + \dfrac{1}{3} = \dfrac{15}{3} = 5$$

if $d = \text{odd}, d > \dfrac{n-1}{2}$

However, as previously described, the minimum distance of the coding scheme shown in Table 1 (and implemented in the Repeater 448 of FIG. 1) is only 4 bits. This minimum distance of 4 bits is less than the maximal minimum distance of 5 bits, as calculated using the Plotkin bound. As such, embodiments of the invention are directed towards designing and/or utilizing a coding scheme that provides improved performance relative to the repetition encoding scheme of Table 1 . In particular, exemplary embodiments are directed to designing and/or utilizing an (8, 2) code, the codewords of which provide the maximal minimum distance of 5 bits.

Regarding error correction capability, if the minimum distance of a given code is equal to or greater than (2a+1), where 'a' is an integer, then up to 'a' bit errors can be corrected. Under this formulation, in the repetition encoding scheme of Table 1, the minimum distance is 4 bits, and, therefore, up to 1 bit error can be corrected. In contrast, in a code that provides a minimum distance of 5 bits, up to 2 bit errors can be corrected. This increase in the number of bit errors that can be corrected reflects a significant improvement relative to the repetition encoding scheme of Table 1.

According to one embodiment, an (8, 2) code is designed using a simplex code and a shortened Hamming code.

Belonging to the field of (n, 2) codes, in which the number of information bits is two, is a (3, 2) simplex code. In general, simplex codes may be described as (n, k) codes, where n is equal to 2k−1. As such, if the number of information bits is 2, then n=2(2)−1=3, and the corresponding simplex code is a (3, 2) simplex code. Codewords of an example of a (3, 2) simplex code are shown in Table 2 below.

TABLE 2

Example of (3, 2) Simplex code

| SRC values | Codeword |
| --- | --- |
| 0x0 (00) | 000 |
| 0x1 (01) | 101 |
| 0x2 (10) | 011 |
| 0x3 (11) | 110 |

Simplex codes are optimal in the sense that they meet the upper bound of the Plotkin bound. For example, the (3, 2) simplex code shown above in Table 2 achieves the maximal minimum distance of 2. It should be noted that, if the individual bits of the codewords are entered in the form of a matrix (e.g., a 4×3 matrix), swapping entries of one matrix column with those of another matrix column (or swapping entries of one matrix row with those of another matrix row) does not affect the minimum-distance aspect of the coding performance (i.e., the same coding performance is provided). Also, changing the value of codeword bits from 1 to 0 and from 0 to 1 also does not affect this aspect of the coding performance.

In addition, changing the mapping between information values and codewords also does not affect coding performance. For example, in the above Table 2, the SRC value of 0x0 is mapped to the codeword "000" and the SRC value of 0x1 is mapped to the codeword "101". If the mapping were changed such that the SRC value of 0x0 is mapped to the codeword "101" and the SRC value of 0x1 is mapped to the codeword "000", the coding performance would not be affected. Therefore, it is understood that Table 2 shows but one example of a (3, 2) simplex code and that multiple variations of this code may be suitable.

Also belonging to the field of (n, 2) codes, in which the number of information bits is two, is the (5, 2) shortened Hamming code (5, 2). More details regarding the (5, 2) shortened Hamming code will be presented below. However, selected general information regarding Hamming codes will first be presented. In general, an [n, k, d] binary Hamming code has properties as defined in Table 3 below.

TABLE 3

Properties of Hamming code

| Parameter | Value |
| --- | --- |
| Number of codeword bits | $n = 2^m - 1$ |
| Number of information bits | $k = 2^m - m - 1$ |
| Number of parity bits | $n - k = m$ |
| Minimum distance | $d = 3$ |

One representative example of a Hamming code having a relatively short length is a (7, 4) Hamming code. Such a Hamming code may be shortened such that the shortened Hamming code satisfies the properties as shown in Table 4 below.

TABLE 4

Properties of shortened Hamming code

| Parameter | Value |
| --- | --- |
| Number of codeword bits | $n = 2^m - l - 1$ |
| Number of information bits | $k = 2^m - m - l - 1$ |
| Number of parity bits | $n - k = m$ |
| Minimum distance | $d \geq 3$ |

Based on the properties shown in Table 4, if it is assumed that l=2, then the (7, 4) Hamming code can be shortened to a (5, 2) shortened Hamming code. One example of a (5, 2) shortened Hamming code is shown in Table 5.

TABLE 5

Example of (5, 2) shortened Hamming code

| SRC values | Codeword |
| --- | --- |
| 0x0 (00) | 00000 |
| 0x1 (01) | 01101 |
| 0x2 (10) | 10011 |
| 0x3 (11) | 11110 |

As shown in Table 4, the shortened Hamming code provides a minimum distance of at least 3. The example (5, 2) shortened Hamming code of Table 5 provides a minimum distance of 3. Similar to changes described previously with respect to the (3, 2) simplex code of Table 2, certain changes to the codewords of the (5, 2) shortened Hamming code of Table 5 will not affect coding performance of the code. For example, if the individual bits of the codewords are entered in the form of a matrix (e.g., a 4×5 matrix), swapping entries of one matrix column with those of another matrix column (or swapping entries of one matrix row with those of another matrix row) does not affect the minimum-distance aspect of the coding performance (i.e., the same coding performance is provided). Also, changing the value of codeword bits from 1 to 0 and from 0 to 1 also does not affect this aspect of the coding performance.

In addition, changing the mapping between information values and codewords also does not affect coding performance. For example, in the above Table 5, the SRC value of 0x0 is mapped to the codeword "00000" and the SRC value of 0x1 is mapped to the codeword "01101". If the mapping were changed such that the SRC value of 0x0 is mapped to the codeword "01101" and the SRC value of 0x1 is mapped to the codeword "00000", the coding performance would not be affected. Therefore, it is understood that Table 5 shows but one example of a (5, 2) shortened Hamming code and that multiple variations of this code may be suitable.

According to one embodiment, an (8, 2) code is designed using a (3, 2) simplex code (e.g., the (3, 2) simplex code of Table 2) and a (5, 2) shortened Hamming code (e.g., the (5, 2) shortened Hamming code of Table 5).

According to a particular embodiment, the codewords of the (8, 2) code are formed by combining (or joining) the codewords of the (3, 2) simplex code with the codewords of the (5, 2) shortened Hamming code. For example, for the SRC value of 0x1, the codeword of the (8, 2) code is formed by combining the corresponding codeword of the (3, 2) simplex code (i.e., "101") and the corresponding codeword of the (5, 2) shortened Hamming code (i.e., "01101") to form a combined codeword of "10101101". That is, the codewords of the (8, 2) code are formed by pasting the two codes (i.e., the (3, 2) simplex code and the (5, 2) shortened Hamming code) side by side. For example, for the SRC value of 0x2, the codeword of the (8, 2) code is formed by pasting the corresponding codeword of the (3, 2) simplex code (i.e., "011") and the corresponding codeword of the (5, 2) shortened Hamming code (i.e., "10011") to form a combined codeword of "01110011". The codewords of the resulting (8, 2) code are shown in Table 6.

TABLE 6

Example of (8, 2) code by combining (3, 2) simplex code and (5, 2) shortened Hamming code

| SRC values | Codeword |
| --- | --- |
| 0x0 (00) | 00000000 |
| 0x1 (01) | 10101101 |
| 0x2 (10) | 01110011 |
| 0x3 (11) | 11011110 |

Regarding the codewords of Table 6, it can be observed that the first 3 bits (i.e., the most significant 3 bits) of each codeword originate from the codewords of Table 2 and that the last 5 bits (i.e., the least significant 5 bits) of each codeword originate from the codewords of Table 5. The (8, 2) code of Table 6 provides the optimal performance in that its codewords provide the maximal minimum distance (among (8, 2) codes)—i.e., a distance of 5 bits.

As previously described with respect to the (3, 2) simplex code and the (5, 2) shortened Hamming code, many variations of these codes can be made without negatively affecting coding performance. Similarly, multiple variations of the (8, 2) code of Table 6 can be made. For example, if the individual bits of the codewords are entered in the form of a matrix (e.g., a 4×8 matrix), swapping entries of one matrix column with those of another matrix column (or swapping entries of one matrix row with those of another matrix row) does not affect the minimum-distance aspect of the coding performance (i.e., the same coding performance is provided). Also, changing the value of codeword bits from 1 to 0 and from 0 to 1 also does not affect this aspect of the coding performance.

In addition, changing the mapping between information values and codewords also does not affect coding performance. For example, in the above Table 6, the SRC value of 0x0 is mapped to the codeword "00000000" and the SRC value of 0x1 is mapped to the codeword "10101101". If the mapping were changed such that the SRC value of 0x0 is mapped to the codeword "10101101" and the SRC value of 0x1 is mapped to the codeword "00000000", the coding performance would not be affected. Therefore, it is understood that Table 6 shows but one example of a (8, 2) code and that multiple variations of this code may be suitable. Furthermore, the (3, 2) simplex code of Table 2 and/or the (5, 2) shortened Hamming code of Table 5 could be modified (as described previously) and then combined to form an (8, 2) code. As such, it is understood that, according to embodiments of the invention, multiple variations of the (8, 2) code of Table 6 may be suitable.

According to one embodiment, one variation of the (8, 2) code of Table 6 is the (8, 2) code of Table 7 shown below. Similar to the code of Table 6, the code of Table 7 provides a maximum minimum distance of 5. Relative to the codewords of Table 6, the codewords of Table 7 are formed by performing column swap operations, as described previously. That is, the codewords of Table 7 are formed by effectively moving (or shifting) the fourth and fifth most significant bits of each codeword to the two least significant bit positions.

TABLE 7

One example of a variation of the (8, 2) code of Table 6

| SRC values | Codeword |
| --- | --- |
| 0x0 (00) | 00000000 |
| 0x1 (01) | 10110101 |
| 0x2 (10) | 01101110 |
| 0x3 (11) | 11011011 |

The (8, 2) code of Table 7 may also be described as being formed by repeating the (3, 2) simplex code of Table 2 two times and then joining the resulting codeword with the two corresponding information bits. For example, regarding the SRC value of 0x1, the codeword "10110101" can be described as being formed by repeating the corresponding codeword of Table 2 ("101") two times and then joining the resulting codeword ("101101") with the two corresponding information bits ("01").

According to another embodiment, another variation of the (8, 2) code of Table 6 is shown in Table 8 below. This variation is formed by moving $4^{th}$ and $5^{th}$ columns of codewords in Table 6 to the beginning.

Similar to the code of Table 6, the code of Table 8 provides a maximum minimum distance of 5.

TABLE 8

Another example of a variants from (8, 2) code of Table 6

| SRC values | Codeword |
| --- | --- |
| 0x0 (00) | 00000000 |
| 0x1 (01) | 01101101 |
| 0x2 (10) | 10011011 |
| 0x3 (11) | 11110110 |

According to another embodiment, another variation of the code of Table 6 is the coding scheme shown in Table 9 below. This variation is formed by two steps from Table 8. The first step is to cyclically shift columns from $3^{rd}$ through $5^{th}$ down by one, which means to move the specific bits, 3rd to 5th column bits, to the next codeword located at next rows in Table 8. And the second step is to cyclically shift down columns from 6th through 8th by two, which corresponds to remap the 6th to 8th column bits to the two rows down codeword in Table 8.

Regarding the code of Table 9, special efforts have been made in order to make the number of ones between codewords distributed as fairly as possible.

TABLE 9

One example of variants from (8, 2) code in Table 6

| SRC values | Codeword |
| --- | --- |
| 0x0 (00) | 00110011 |
| 0x1 (01) | 01000110 |
| 0x2 (10) | 10101000 |
| 0x3 (11) | 11011101 |

As described previously, it is understood that there are embodiments of the invention include variations of the (8, 2) code of Table 6. Examples of such variations were shown in Tables 7, 8 and 9. For convenience of description, additional variations of the (8, 2) code of Table 6 will not be presented below.

According to one embodiment, an encoder in a transmitter of a mobile station (MS) in a MIMO system is configured to encode information bits (e.g., information regarding spatial rank) in accordance with a coding scheme such as the scheme of Table 6 (or Table 7, Table 8, Table 9, or a suitable variation thereof.) An exemplary embodiment of such a transmitter will now be described with reference to FIG. 2.

Figure 2:
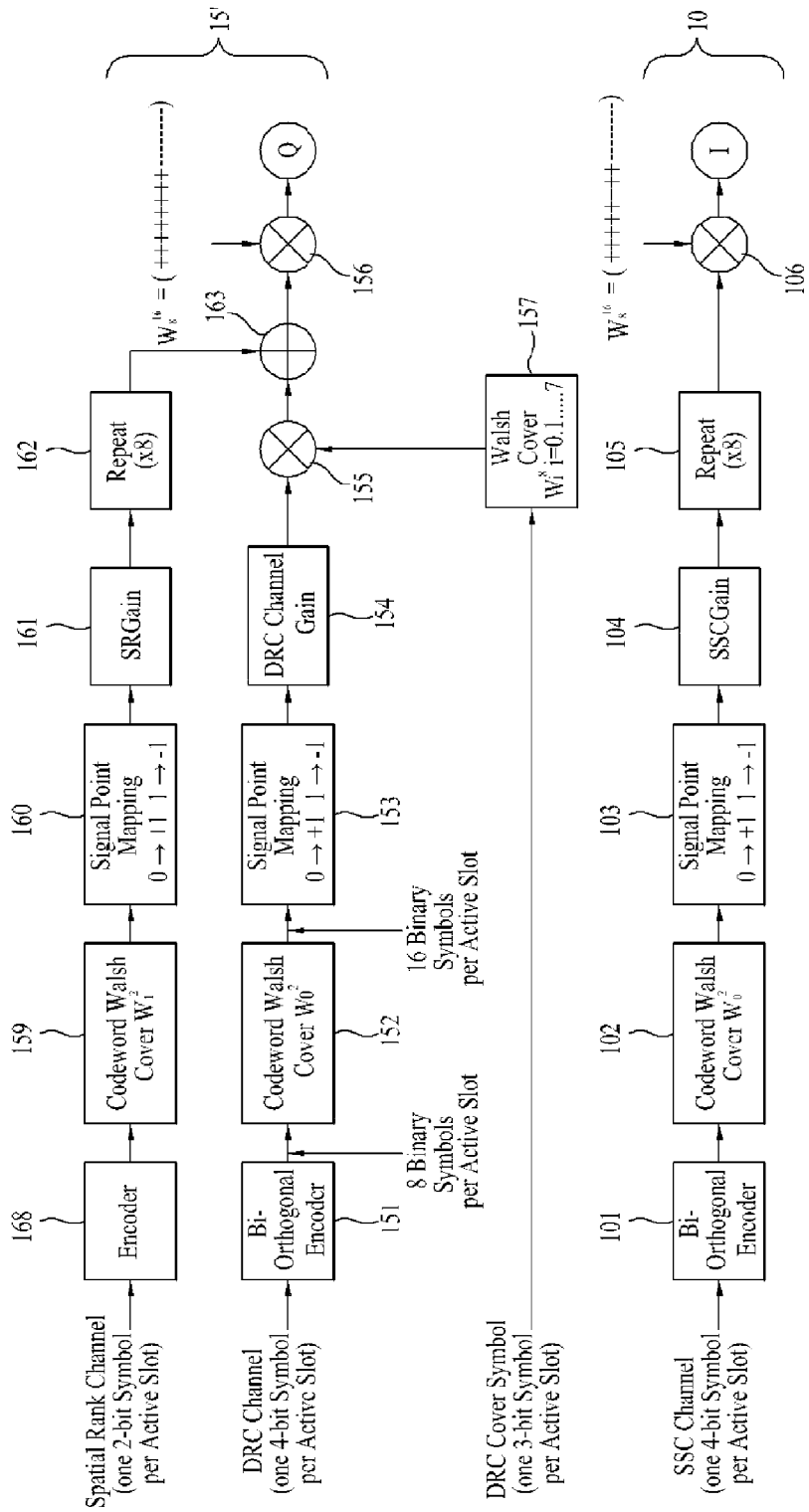
FIG. 2 is a partial block diagram of various operations implemented by an MS transmitter in a MIMO system according to one embodiment.

With reference to FIG. 2, portions of an MS transmitter in a MIMO system are configured to encode and modulate information including spatial rank and spatial signature. In the following description regarding FIG. 2, the spatial rank and spatial signature information will be described with reference to a system employing 4 transmit antennas. It is understood that, in a system employing only 2 transmit antennas, certain parameters may differ from the 4-transmit-antenna system. For example, relative to a system employing 4 transmit antennas, a system employing only 2 transmit antennas may require a different number of bits to convey spatial rank and spatial signature information.

With reference to FIG. 2, a transmitter (e.g., mobile communication module 413 or controller 480 of FIG. 4) of the mobile terminal 40 is configured to encode and modulate a four-bit spatial signature and a two-bit spatial rank for a system employing four transmit antennas.

The transmitter includes an In-Phase branch (I-Branch) 10 and a Quadrature Branch (Q-Branch) 15'. The I-Branch 10 includes a Bi-Orthogonal Encoder 101, a Codeword Walsh Cover ($W_0^2$) component 102, a Signal Point Mapper 103, a spatial signature channel (SSC) Gain element 104, a Repeater (×8) 105, and a Modulator 106. The Q-Branch 15' includes a Bi-Orthogonal Encoder 151, a Codeword Walsh Cover ($W_0^2$) component 152, a Signal Point Mapper 153, a direct rate control (DRC) Channel Gain element 154, Modulators 155 and 156, and a Walsh Cover ($W_i^8$) component 157. In addition, the Q-Branch 15' includes an Encoder 168, a Codeword Walsh Cover ($W_1^2$) component 159, a Signal Point Mapper 160, a spatial rank channel (SRC) Gain element 161, a Repeater (×8) 162, and an adder 163.

With continued reference to FIG. 2, a four-bit SSC symbol is input to the I-Branch 10. A two-bit SRC symbol and a four-bit DRC symbol are input to the Q-Branch 15'. Because the SRC symbol is two bits long, the symbol can convey up to 4 distinct spatial rank values (e.g., spatial rank values ranging from 0 to 3, ranging from 1 to 4, etc.). Similarly, because the SSC symbol is four bits long, it can support up to sixteen distinct spatial signatures. These spatial signatures may be predefined for the system, predefined for each particular sector, or negotiated during connection setup. According to various embodiments, a set of distinct spatial signatures numbering from 9 to 15 are predefined or negotiated.

As previously described, the two-bit SRC symbol is input to the Q-Branch 15'. In more detail, the two-bit SRC symbol is input to the Encoder 168 before being spread by the Codeword Walsh Cover ($W_1^2$) component 159. The Encoder 168 is configured to encode the two-bit SRC symbol in accordance with a coding scheme such as the scheme of Table 6 (or Table 7, Table 8, Table 9, or a suitable variation thereof). For example, according to a particular embodiment in which the Encoder 168 is configured to encode the two-bit SRC symbol in accordance with the coding scheme of Table 6, a two-bit SRC symbol of '00' is encoded by the Encoder 168 as a codeword of '00000000'. Similarly, a two-bit SRC symbol of '01' is encoded by the Encoder 168 as a codeword of '10101101'. According to other embodiments, the Encoder 168 is configured to encode the two-bit SRC symbol in accordance with a suitable variation of the coding scheme of Table 6 (e.g., the coding scheme of Table 7, the coding scheme of Table 8, the coding scheme of Table 9, or some other suitable variation of the Table 6 coding scheme, created, for example, by modifying the Table 6 coding scheme, as described previously.)

In essence, the Encoder 168 implements an (8, 2) binary coding scheme in producing the codewords. The minimum distance of the coding scheme is 5 bits. As such, the coding scheme implemented in the Encoder 168 provides a minimum distance of 5 bits. Therefore, the coding scheme implemented in the Encoder 168 achieves the maximal minimum distance according to the Plotkin bound.

The embodiment described with reference to FIG. 2 may be used in a system employing 4 transmit antennas in HRPD revision C. The described embodiment enhances the performance of feedback of spatial rank reporting. Unlike the system of FIG. 1, the embodiment of FIG. 2 employs encoder 168 rather than Repeater (×4) 158 to receive and encode the input SRC symbol.

With reference to FIG. 1, the 2-bit rank information is repeated 4 times in repeater 158 before length 2 Walsh code spreading in Codeword Walsh Cover ($W_1^2$) component 159. Because the Walsh code spreading with length 2 is common to both the SRC channel and the DRC, the replacement of the repeater 158 of FIG. 1 with the encoder 168 of FIG. 2 does not affect the overall structure of these systems. As such, various aspects of existing channel structure and newly designed channels may be left significantly unaltered.

Figure 3:
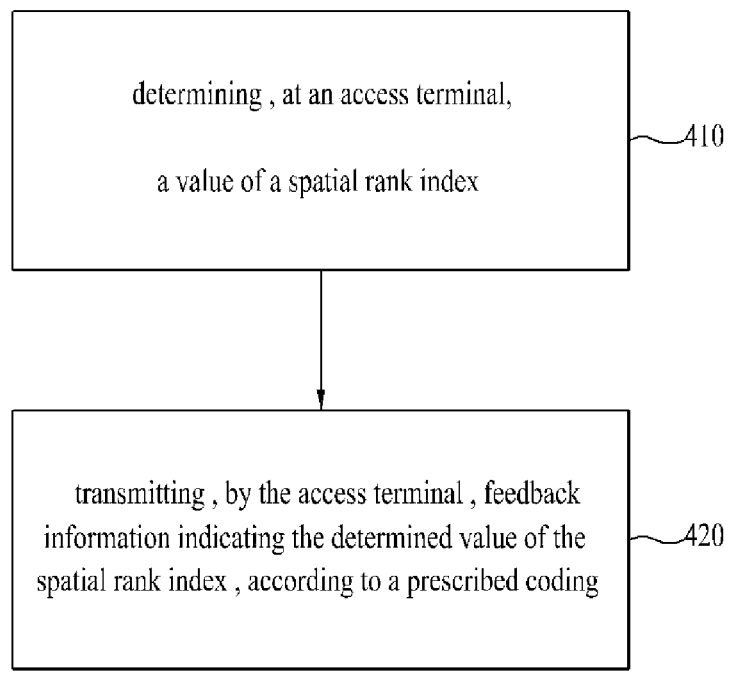
FIG. 3 shows a flowchart for transmitting feedback information via a Spatial Rank Index (SRI) channel, according to one embodiment.

With reference to FIG. 3, a method for transmitting feedback information via a Spatial Rank Index (SRI) channel will now be described. In box 310, a value of a spatial rank index is determined at an access terminal (or mobile station). In box 320, feedback information indicating the determined value of the spatial rank index is transmitted, according to a prescribed coding. According to a particular embodiment, the prescribed coding corresponds to the coding scheme of Table 6.

Figure 4:
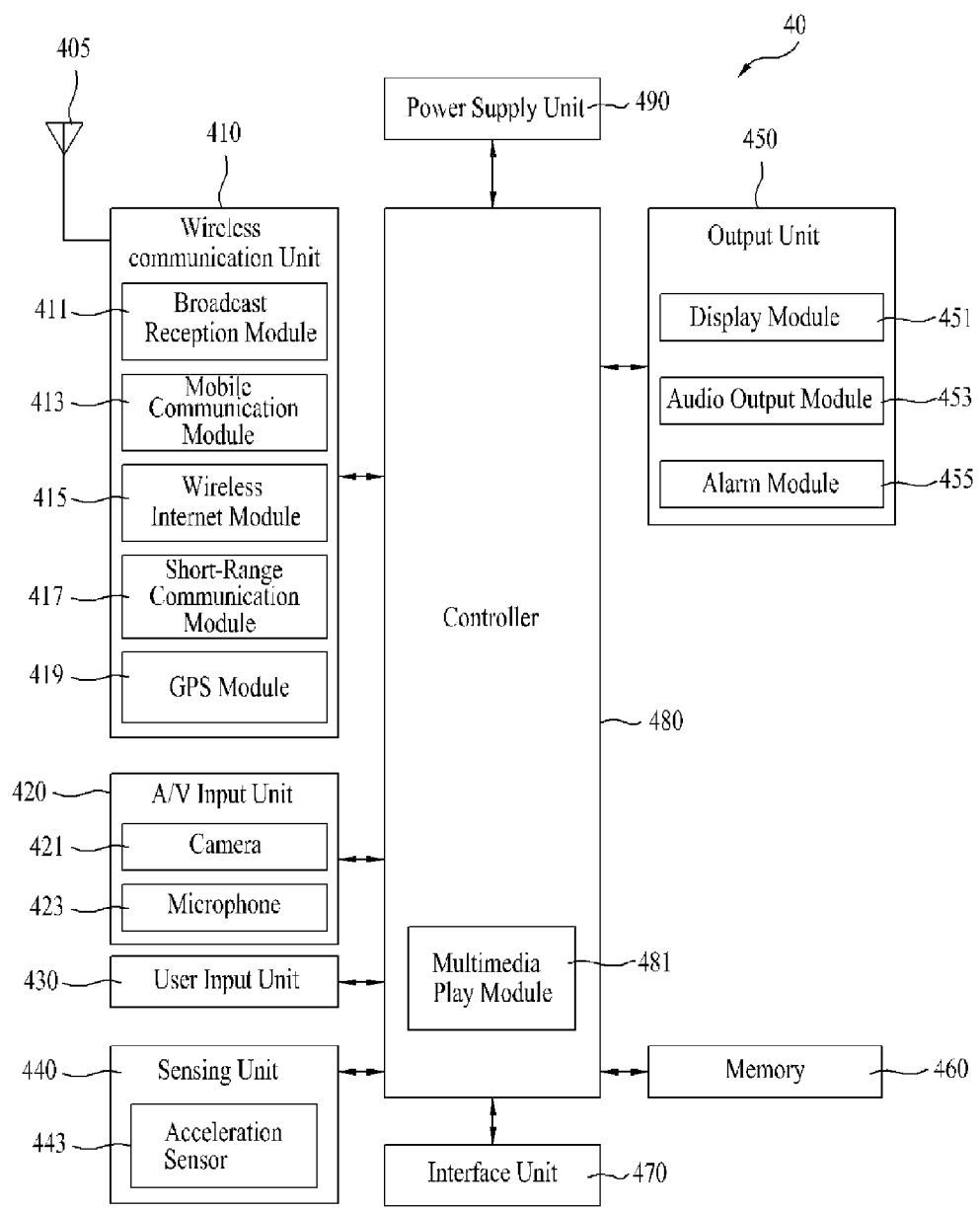
FIG. 4 is a block diagram showing in more detail various components which may be implemented in a mobile station according to various embodiments of the present invention.

FIG. 4 is a block diagram showing in more detail various components which may be implemented in MS 40 according to various embodiments of the present invention. It is understood that greater or fewer components than those shown may be implemented.

Referring to FIG. 4, the MS 40 (sometimes referred to herein as an access terminal or mobile terminal) may include a wireless communication unit 410, an audio/video (A/V) input unit 420, a user input unit 430, a sensing unit 440, an output unit 450, a memory 460, an interface unit 470, a controller (or control unit) 480, and a power supply unit 490. Two or more of the wireless communication unit 410, the A/V input unit 420, the user input unit 430, the sensing unit 440, the output unit 450, the memory 460, the interface unit 470, the controller 480, and the power supply unit 490 may be incorporated into a single unit, or some of the wireless communication unit 410, the A/V input unit 420, the user input unit 430, the sensing unit 440, the output unit 450, the memory 460, the interface unit 470, the controller 480, and the power supply unit 490 may be divided into two or more smaller units.

The wireless communication unit 410 may include a broadcast reception module 411, a mobile communication module 413, a wireless Internet module 415, a short-range communication module 417, and a global positioning system (GPS) module 419.

The broadcast reception module 411 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to MS 40 through a mobile communication network. In this case, the broadcast-related information may be received by the mobile communication module 413, rather than by the broadcast reception module 411. The broadcast-related information may come in various forms, for example, electronic program guide (EPG) of digital multimedia broadcasting (DMB) or electronic service guide (ESG) of digital video broadcast-handheld (DVB-H).

Broadcast reception module 411 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 411 may be configured to be suitable for nearly all types of broadcasting systems other than those set forth herein.

The broadcast signal and/or the broadcast-related information received by the broadcast reception module 411 may be stored in memory 460.

The mobile communication module 413 transmits wireless signals to or receives wireless signals from at least one or more of a base station, an external station, and a server through a mobile communication network. The wireless signals may include various types of data according to whether the MS 40 transmits/receives voice call signals, video call signals, or text/multimedia messages.

The wireless Internet module 415 may be a module for wirelessly accessing the Internet. The wireless Internet module 415 may be embedded in the MS 40 or may be installed in an external device.

The short-range communication module 417 may be a module for short-range communication. The short-range communication module 417 may use various short-range communication techniques such as Bluetooth®, radio frequency identification (RFID), infrared data association (IrDA), ultra wideband (UWB), and ZigBee®.

The GPS module 419 may receive position information from one or more satellites (e.g., GPS satellites).

The A/V input unit 420 may be used to receive audio signals or video signals. The A/V input unit 420 may include one or more cameras 421 and a microphone 423. The camera 421 processes various image frames such as still images or moving images captured by an image sensor during a video call mode or an image capturing mode. The image frames processed by the camera 421 may be displayed by a display module 451.

The image frames processed by the camera 421 may be stored in the memory 460 or may be transmitted outside the MS 40 through the wireless communication unit 410. The MS 40 may include more than two cameras.

The microphone 423 receives external sound signals during a call mode, a recording mode, or a voice recognition mode with the use of a microphone and converts the sound signals into electrical sound data. In the call mode, the mobile communication module 413 may convert the electrical sound data into data that can be readily transmitted to a mobile communication base station and then output the data obtained by the conversion. The microphone 423 may use various noise removal algorithms to remove noise that may be generated during the reception of external sound signals.

The user input unit 430 generates key input data based on user input for controlling the operation of the MS 40. The user input unit 430 may be implemented as a keypad, a dome switch, a touch pad (either static pressure or constant electricity), a jog wheel, or a jog switch. In particular, if the user input unit 430 is implemented as a touch pad and forms a mutual layer structure along with the display module 451, the user input unit 430 and the display module 451 may be collectively referred to as a touch screen.

The sensing unit 440 determines a current state of the MS 40 such as whether the MS 40 is opened or closed, the position of the MS 40 and whether the MS 40 is placed in contact with a user. In addition, the sensing unit 440 generates a sensing signal for controlling the operation of the MS 40.

For example, when the MS 40 is a slider-type mobile phone, the sensing unit 440 may determine whether the MS 40 is opened or closed. In addition, the sensing unit 440 may determine whether the MS 40 is powered by the power supply unit 490 and whether the interface unit 470 is connected to an external device.

The sensing unit 440 may include an acceleration sensor 443. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 443 representing different axial directions may be installed in the MS 40. Alternatively, only one acceleration sensor 443 representing a Z axis may be installed in the MS 40.

The output unit 450 may output audio signals, video signals, and alarm signals. The output unit 450 may include the display module 451, an audio output module 453, and an alarm module 455.

The display module 451 may display various information processed by the MS 40. For example, if the MS 40 is in a call mode, the display module 451 may display a user interface (UI) or a graphical user interface (GUI) for making or receiving a call. If the MS 40 is in a video call mode or an image capturing mode, the display module 451 may display a UI or a GUI for capturing or receiving images.

If the display module 451 and the user input unit 430 form a mutual layer structure and are thus implemented as a touch screen, the display module 451 may be used not only as an output device but also as an input device. If the display module 451 is implemented as a touch screen, the display module 451 may also include a touch screen panel and a touch screen panel controller.

The touch screen panel is a transparent panel attached onto the exterior of the MS 40 and may be connected to an internal bus of the MS 40. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 480. The control unit 480 then determines whether a touch input has been generated and which part of the touch screen panel has been touched based on the processed signals transmitted by the touch screen panel controller.

As described above, if the display module 451 and the user input unit 430 form a mutual layer structure and are thus implemented as a touch screen, the display module 451 may be used not only as an output device but also as an input device. The display module 451 may include at least one of a liquid crystal display (LCD), a thin film transistor (TFT)-LCD, an organic light-emitting diode (OLED), a flexible display, and a three-dimensional (3D) display.

The MS 40 may include two or more display modules 451. For example, the MS 40 may include an external display module and an internal display module.

The audio output module 453 may output audio data received by the wireless communication unit 410 during a call reception mode, a call mode, a recording mode, a voice recognition mode, or a broadcast reception mode or may output audio data present in the memory 460. In addition, the audio output module 453 may output various sound signals associated with the functions of the MS 40 such as receiving a call or a message. The audio output module 453 may include a speaker and a buzzer.

The alarm module 455 may output an alarm signal indicating the occurrence of an event in the MS 40. Examples of the event include receiving a call signal, receiving a message, and receiving a key signal. Examples of the alarm signal output by the alarm module 455 include an audio signal, a video signal, and a vibration signal.

The alarm module 455 may output a vibration signal upon receiving a call signal or a message. In addition, the alarm module 455 may receive a key signal and may output a vibration signal as feedback to the key signal.

Once a vibration signal is output by the alarm module 455, the user may recognize that an event has occurred. A signal for notifying the user of the occurrence of an event may be output by the display module 451 or the audio output module 453.

The memory 460 may store various programs necessary for the operation of the controller 480. In addition, the memory 460 may temporarily store various data such as a phonebook, messages, still images, or moving images.

The memory 460 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The MS 40 may operate a web storage, which performs the functions of the memory 460 on the Internet.

The interface unit 470 may interface with an external device that can be connected to the MS 40. The interface unit 470 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 470 may receive data from an external device or may be powered by an external device. The interface unit 470 may transmit data provided by an external device to other components in the MS 40 or may transmit data provided by other components in the MS 40 to an external device.

The controller 480 may control the general operation of the MS 40. For example, the controller 480 may perform various control operations regarding making/receiving a voice call, transmitting/receiving data, or making/receiving a video call.

The controller 480 may include a multimedia play module 481, which plays multimedia data. The multimedia play module 481 may be implemented as a hardware device and may be installed in the controller 480. Alternatively, the multimedia play module 481 may be implemented as a software program.

The power supply unit 490 is supplied with power by an external power source or an internal power source and supplies power to other components in the MS 40.

In alternative implementations, certain logic operations may be performed in a different order, modified or removed and still implement exemplary embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which exemplary embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for transmitting rank information at an access terminal, the method comprising:
   encoding a spatial rank index using a prescribed coding scheme,
   transmitting the rank information corresponding to the spatial rank index,
   wherein the spatial rank index is encoded using a corresponding codeword of Table A according to the prescribed coding scheme,

TABLE A

| spatial rank index | codeword |
| --- | --- |
| 0x0 | (0, 0, 0, 0, 0, 0, 0, 0) |
| 0x1 | (1, 0, 1, 0, 1, 1, 0, 1) |
| 0x2 | (0, 1, 1, 1, 0, 0, 1, 1) |
| 0x3 | (1, 1, 0, 1, 1, 1, 1, 0). |

2. The method of claim 1, wherein the rank information indicates a number of spatial rank.

3. The method of claim 1, wherein the rank information is transmitted through a spatial rank index (SRI) channel.

4. The method of claim 1, wherein the prescribed coding scheme uses a (8, 2) code, wherein the "8" represents a length of the corresponding codeword and the "2" represents a number of encoded information bits in the corresponding codeword.

5. An access terminal for transmitting rank information, the access terminal comprising:
   an encoder configured to encode a spatial rank index using a prescribed coding scheme; and
   a transmitter configured to transmit the rank information corresponding to the spatial rank index,
   wherein the spatial rank index is encoded using a corresponding codeword of Table A according to the prescribed coding scheme,

TABLE A

| spatial rank index (SRI) | Codeword |
| --- | --- |
| 0x0 | (0, 0, 0, 0, 0, 0, 0, 0) |
| 0x1 | (1, 0, 1, 0, 1, 1, 0, 1) |
| 0x2 | (0, 1, 1, 1, 0, 0, 1, 1) |
| 0x3 | (1, 1, 0, 1, 1, 1, 1, 0). |

6. The access terminal of claim 5, wherein the rank information indicates a number of spatial rank.

7. The access terminal of claim 5, wherein the rank information is transmitted through a spatial rank index (SRI) channel.

8. The access terminal of claim 5, wherein the prescribed coding scheme uses a (8, 2) code, wherein the "8" represents a length of the corresponding codeword and the "2" represents a number of encoded information bits in the corresponding codeword.

* * * * *